Feb. 24, 1959 R. D. SMITH 2,874,458
METHOD OF MAKING AN AIR SPRING
Filed Oct. 10, 1955 2 Sheets-Sheet 1

INVENTOR.
RANDALL D-SMITH
BY W. A. Fraser
ATTY-

Feb. 24, 1959 — R. D. SMITH — 2,874,458
METHOD OF MAKING AN AIR SPRING
Filed Oct. 10, 1955 — 2 Sheets-Sheet 2

INVENTOR.
RANDALL D-SMITH
BY W. A. Fraser
ATTY.

United States Patent Office 2,874,458
Patented Feb. 24, 1959

2,874,458
METHOD OF MAKING AN AIR SPRING

Randall D. Smith, Fishers, Ind., assignor to The Firestone Tire & Rubber Company, Akron, Ohio, a corporation of Ohio Application October 10, 1955, Serial No. 539,477

1 Claim. (Cl. 29—436)

This invention relates to bellows of the type known as air springs and more particularly to an improved method of manufacturing such bellows.

A conventional air spring comprises a rubberized fabric body terminating in and anchored to circular beads. The beads must be strong enough to mount the air spring to a suitable supporting structure and they must be capable of maintaining an air-tight seal to prevent the loss of the high pressure fluids which are employed to operate air springs. The quality of the air spring beads is accordingly an important consideration in the function of the air spring in service.

In the methods heretofore used in manufacturing air springs, the beads often fail to mold properly and many air springs are rejected as unfit for use because the improperly molded beads will fail to seal against the loss of air. The beads are also frequently kinked or otherwise damaged when the air springs are removed from the vulcanizing molds and the air springs must also be rejected. Moreover, the molding equipment which is required to mold the beads and at the same time shape and vulcanize the air springs requires a relatively large number of mold parts and an expensive and complicated mechanism to operate the parts.

The present invention provides an improved method of manufacturing air springs by assembling suitable metal parts with the beads of unvulcanized air springs in such a manner that the metal parts perform the dual functions of molding the beads and subsequently providing a means of securing the air springs to suitable supporting structures. Preferably, the parts take the form of rings which are clamped about the beads. The method is simple and effective and has virtually eliminated the scrapping of air springs because of defective beads. By such a method the beads are rendered air-tight and the problem of loss of air at the beads is virtually eliminated.

It is accordingly a general object of the invention to provide an improved method of manufacturing bellows of the air spring type.

A more specific object is to crimp metallic rings or other parts about the beads of unvulcanized air springs prior to the shaping and vulcanizing operation, utilizing such rings as molding elements for the beads and as a means to secure the vulcanized air spring to a supporting structure, usually in a vehicle suspension.

Other objects are to provide a method of manufacturing air springs which provides economy in manufacture, which is simple and effective, which enables simple molding apparatus to be used, and which produces a good quality product.

The above and further objects and advantages will be more fully apparent from the following description of a preferred form of the invention in which.

The invention is described with respect to the manufacture of a single convolution air spring having beads of equal diameter but it will be apparent that the method can be used with advantage in the manufacture of multi-convolution air springs and with air springs having beads of different diameter.

Figure 1:
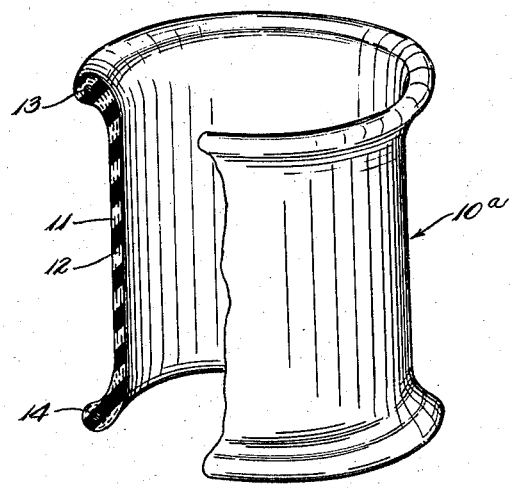
Figure 1 is a perspective view of an unvulcanized air spring, with a portion broken away to show the air spring in longitudinal section.
Figure 2:
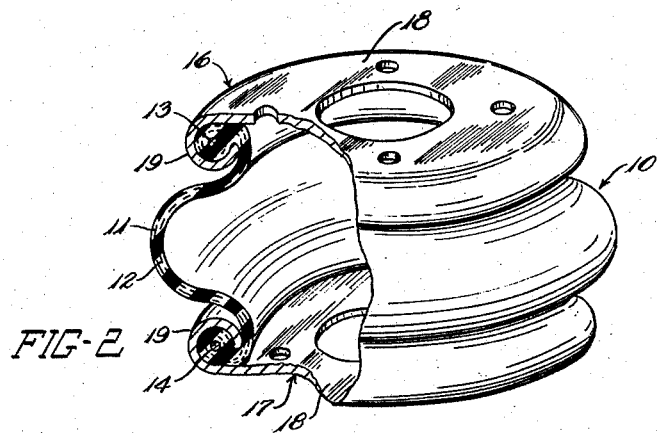
Figure 2 is a perspective view of a vulcanized air spring assembled with metal members at each end, a portion of the air spring being broken away to show the air spring in longitudinal section and to show the manner in which the members are crimped about the beads of the air spring.

Such a single convolution air spring indicated generally at 10 in the vulcanized condition, see Figure 2, is usually built of two plies 11 and 12 of rubberized fabric, the ends of which are wrapped about and anchored to a pair of circular beads 13 and 14. The unvulcanized or "green" air spring indicated generally at 10a, see Figure 1, is usually built upon a cylindrical building drum so that it is initially tubular in form.

The air spring is shaped by moving the beads toward each other while simultaneously expanding the body outwardly by fluid pressure into contact with a vulcanizing mold. Heretofore, in order to accomplish this shaping and molding operation, it has been necessary to provide a mold having separate mold sections which may be clamped about each of the beads in a manner to provide a tight seal so as to retain the fluid which expands and shapes the air spring. Such mold sections must also mold the beads into their finally vulcanized form. As a result the molds are complex and costly and any inadvertence in positioning the air spring in the mold or in removing the vulcanized air spring from the mold often results in a defective bead structure necessitating scrapping of the air spring.

Figure 3:
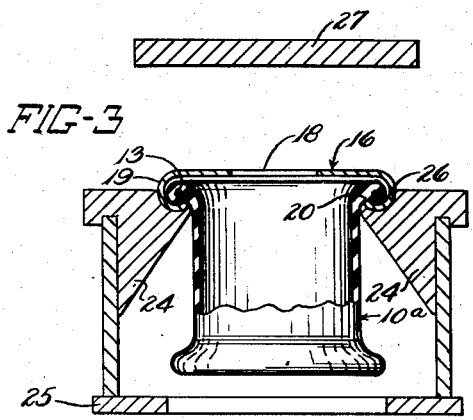
Figure 3 is a diagrammatic view, showing in a longitudinal section, the tools and the manner in which an end member is crimped about one of the beads of an unvulcanized air spring.
Figure 4:
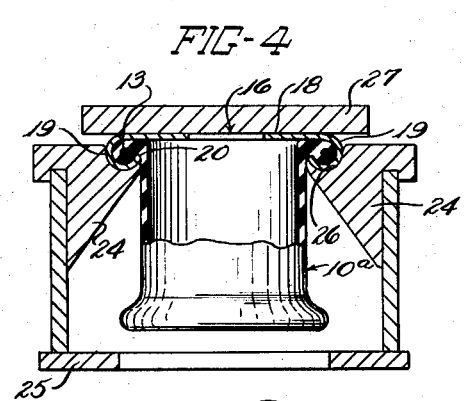
Figure 4 is a view similar to Figure 3 showing the final stage in the crimping operation, prior to vulcanization of the air spring.

These difficulties are obviated in the present invention by crimping a pair of rings about the beads of an unvulcanized or green air spring. In the present example, the rings actually comprise the flanges of cup members 16 and 17 which are identical in construction. Initially the members are drawn from sheet metal of appropriate gauge and have flat bases 18 and cylindrical sidewalls. Just prior to assembly with an air spring the sidewall 19 is crimped or curled over until it takes the form shown in Figure 3. Sufficient clearance between the edge 20 of the sidewall and the flat base 18 is provided to enable the bead 13 to be readily introduced therein. In the next step the end ring is crimped more tightly about the bead by crimping tools such as those shown diagrammatically in Figures 3 and 4.

Figure 5:
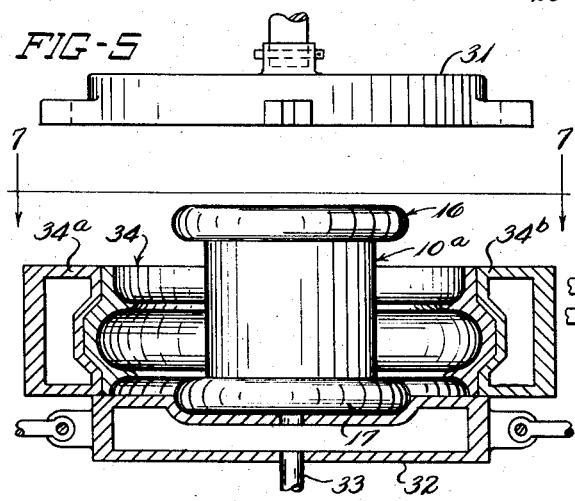
Figure 5 is a diagrammatic view, partly in longitudinal section, showing the mold assembly in which the air spring of Figure 4 is shaped and vulcanized, the mold being shown in open position with the air spring in place.

The temporarily assembled air spring end member 16 are supported in a curling die comprising a plurality of segments 24 which are supported by a cylindrical stand 25. Preferably four such segments comprise the die and these segments define a circular forming groove 26 which is curved in a vertical plane as shown in the drawings to conform to the partially curled sidewall 19. The crimping operation is performed by means of a ram indicated at 27 which descends and forces the sidewall to follow the contour of the forming groove and close tightly about the bead. This operation is performed readily upon the cold metal and in this step of the operation the edge 20 of the end member is curled about until it pinches the bead at its juncture with the body. With a two-ply air spring this clearance will be about 5/32 inch. After one member is crimped about a bead the air spring is reversed in the curling die and the second end member is assembled with the air spring in like fashion. The assembled air spring and end members have the appearance shown in Figure 5 and the air spring in this condition is ready for the shaping and vulcanizing operation.

Figure 8:
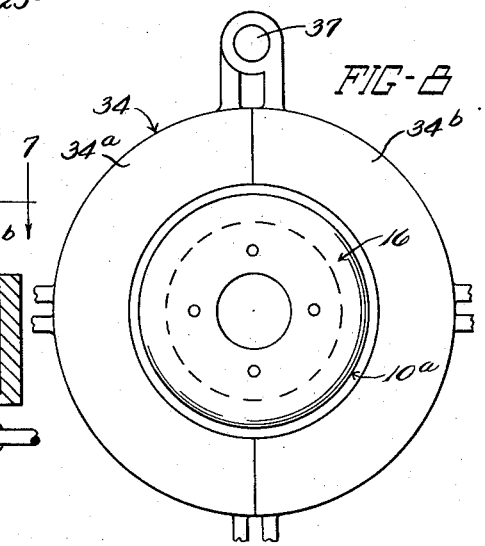
Figure 8 is a view similar to that of Figure 7 showing the central portion of the mold fully closed about the air spring.
Figure 7:
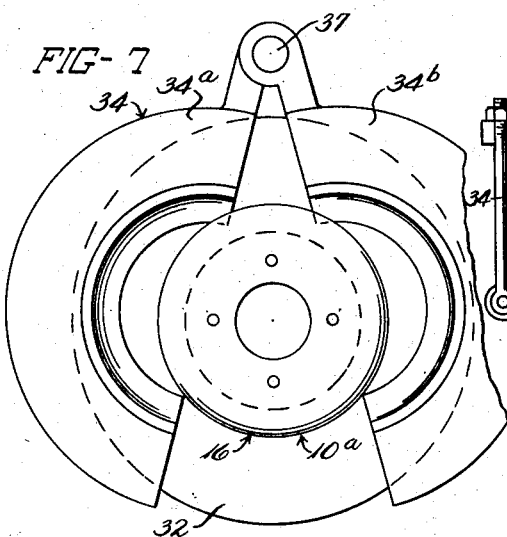
Figure 7 is a view taken in the plane indicated by the lines 7—7 in Figure 5 showing the central portion of the mold in open position about the air spring.
Figure 6:
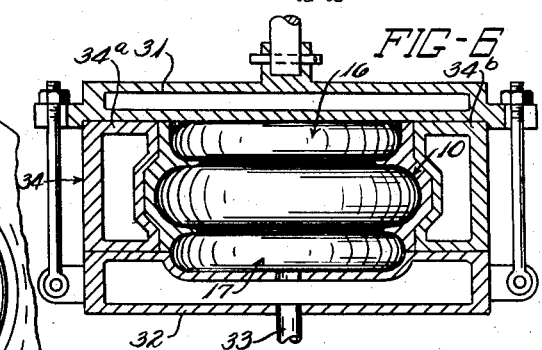
Figure 6 is a view similar to Figure 5, showing the mold fully closed and with the air spring inflated outwardly into contact with the mold surfaces.

The molding apparatus is relatively simple compared with prior equipment. It generally comprises a pair of end sections 31 and 32 which are adapted to contact the end plates and which are relatively movable, by means not shown, to exert axial pressure upon the bellows through the end plates to collapse the bellows as the shaping takes place. As the bellows is collapsed axially, air or steam under pressure is introduced into the interior of the bellows through a conduit 33 which passes through the lower mold section and which connects with the lower end member, the member being perforated to permit this. The mold is completed by a central section indicated generally at 34 which comprises two semicircular halves 34a and 34b which are hinged about a vertical pin 37 so that the section halves may be opened and closed about the body of the air spring. The central mold section is shown in open section in Figures 5 and 7 and is shown in closed position in Figures 6 and 8. Suitable latch means, not shown, is provided to lock the section halves in closed position.

In operation, the air spring is placed with its lower end member 17 resting on the lower mold section 32; the central mold section is then closed and locked about the air spring; and the upper mold section 31 is brought forcibly down upon the air spring while air under pressure is introduced into the interior of the diaphragm. As the diaphragm collapses axially, the air expands the body of the air spring outwardly into contact with the mold cavity surfaces of the central section 34, which shape it into single convolution form.

The mold may be operated automatically by conventional means or a mold may be operated in part manually. The heat required for vulcanization is supplied by the mold which is heated by steam circulating through the hollow mold sections and the heat may also be supplied by steam introduced into the bellows by the conduit 33. After the vulcanization is complete the interior fluid pressure is released, the upper mold section is raised and the central mold section is opened to permit withdrawal of the vulcanized air spring.

There is a tendency for the rubber comprising the beads to shrink slightly in vulcanization and to relieve the force with which the beads are clamped by the end members. It is desirable, therefore, after the vulcanization is complete, to strike the end members in a crimping die such as that shown in Figures 3 and 4 to seat the end members firmly upon the beads. This additional crimp is slight, amounting to about 1/64" to 1/32". Preferably the edge 20 of the members is slightly rounded so that there will be no sharp edge cutting into the rubber.

While cup-shaped members are shown, it will be apparent that annular rings may be substituted or that end members of various shapes and construction may be employed with advantage. The beads illustrated in the present example have flexible, substantially inextensible cores indicated at 13 and 14 which are preferably of twisted metallic cable. The present invention enables rigid, solid ring cores to be used for the molding and vulvanizing apparatus does not require flexible beads. In some cases the inextensible cores may be omitted and solid rubber or fabric-reinforced rubber beads may be employed.

The method of the present invention produces a sound, reliable product and enables substantial savings in tool costs and in manufacturing operation. Scrap, because of defective beads, is greatly minimized.

Various modifications will no doubt occur to those skilled in the art without departing from the scope of the invention, the essential features of which are summarized in the appended claim.

I claim:

The method of manufacturing an air spring adapted to contain fluid under pressure, comprising the steps of building a body of flexible, vulcanizable material having a bead, assembling the annular portion of a metal member with the bead of said airspring by crimping said portion about said bead, vulcanizing the assembled structure, and thereafter additionally crimping said portion about said bead to obviate leakage occasioned by any shrinkage of said material during vulcanization.

References Cited in the file of this patent

UNITED STATES PATENTS

| | | |
|---|---|---|
| 1,867,540 | Rosenberg | July 12, 1932 |
| 2,029,060 | Cozzo | Jan. 28, 1936 |
| 2,221,470 | Brown | Nov. 12, 1940 |
| 2,265,346 | Brown et al. | Dec. 9, 1941 |
| 2,455,737 | Coyle | Dec. 7, 1948 |
| 2,558,140 | Kruzik | June 26, 1951 |
| 2,628,416 | Sampson | Feb. 17, 1953 |